(12) United States Patent
Rodriguez

(10) Patent No.: US 6,811,455 B2
(45) Date of Patent: Nov. 2, 2004

(54) PROPSHAFT WITH FLOATING CENTER SUPPORT

(75) Inventor: Rolando Valentin Rodriguez, Metamora, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/385,864

(22) Filed: Mar. 11, 2003

(65) Prior Publication Data

US 2004/0180587 A1 Sep. 16, 2004

(51) Int. Cl.$^7$ .................................................. B63H 20/08
(52) U.S. Cl. ........................................ 440/53; 180/376
(58) Field of Search .............................. 440/53, 56, 57; 248/60; 180/376, 377, 379, 380, 384

(56) References Cited

U.S. PATENT DOCUMENTS

| | | | | |
|---|---|---|---|---|
| 2,856,883 A | * | 10/1958 | Baker | 440/56 |
| 4,775,342 A | * | 10/1988 | Connor et al. | 440/57 |
| 5,100,350 A | * | 3/1992 | Buzzi | 440/82 |
| 5,791,954 A | * | 8/1998 | Johnson, Jr. | 440/53 |
| 6,234,854 B1 | * | 5/2001 | Rydzewski | 440/57 |
| 6,345,680 B1 | * | 2/2002 | Hill | 180/376 |
| 6,482,057 B1 | * | 11/2002 | Schoell | 440/53 |
| 6,484,976 B1 | * | 11/2002 | Boutin | 248/60 |

* cited by examiner

Primary Examiner—S. Joseph Morano
Assistant Examiner—Lars Olson
(74) Attorney, Agent, or Firm—Laura C. Hargitt

(57) ABSTRACT

The present invention includes a propshaft assembly that has a propshaft connected to a transmission and an axle and a center support that attaches the propshaft to a vehicle. The center support permits the propshaft to move vertically during operation of the vehicle. The present invention also includes a method for damping the natural bending resonance of a propshaft where the propshaft is connected to the underbody of a vehicle with a center support. The center support may be adapted to permit the propshaft to move vertically in response to vertical movement of an axle attached to the propshaft. Alternately, the center support may be adapted to selectively fix the vertical position of the propshaft when the propshaft is approaching its natural bending resonance frequency.

16 Claims, 2 Drawing Sheets

PROPSHAFT WITH FLOATING CENTER SUPPORT

FIELD OF THE INVENTION

This invention relates to improved propshafts for use in motor vehicles and improved center bearing mounts for use in single or multi-piece propshafts.

BACKGROUND OF THE INVENTION

A motor vehicle generally utilizes a driveshaft or propshaft to transfer the mechanical force generated by the engine to the driving wheels of the vehicle, which in turn propel the vehicle. The propshaft connects the transmission, transfer case or power takeoff unit to the driving axle. Propshafts can either be single piece or multi-piece as described below. Space in the underbody of a vehicle is at a premium, and so the diameter of propshaft may have to be reduced to allow the packaging of other components. It is also desirable to minimize the weight of vehicle components to improve performance and fuel economy.

Propshafts can become dynamically unstable if operated at the rotational speed where the propshaft residual imbalance forces coincide with the propshaft first bending mode of vibration, also known as the propshaft natural bending resonance. This rotational speed is known as the propshaft critical speed. The low damping properties of typical materials used in the construction of propshafts result in bending stresses that quickly increase at resonance and may cause the propshaft to fracture. A properly designed propshaft is almost never allowed to operate at its critical speed. One of the factors influencing the bending resonance is the length of the propshaft, such that as the length increases, the bending resonance frequency decreases, and so does the critical speed.

Besides using larger diameter, lighter and more rigid materials for propshafts, one known technique used to overcome the problems associated with a long propshaft has been to split the shaft into multiple sections or pieces. Each shorter piece has a comparatively higher bending resonance. Overall, this gives the propshaft a higher critical speed.

While multi-piece propshafts overcome some of the deficiencies of single piece propshafts, they introduce other problems. For example, multi-piece propshafts tend to exhibit launch shudder. Launch shudder is a severe vibration that occurs when the vehicle starts from a standstill or is driven at low speed during high powertrain torque events. In the case of a two-piece propshaft, a stationary center support and an additional joint are introduced where the two pieces of the propshaft come together. The center joint allows the rear propshaft piece to operate at different angles from the front piece. Typically, the stationary center support attaches the front piece of the propshaft to the vehicle underbody. Since the engine and the transmission are supported on mounts, the position of the front piece of the propshaft is relatively static. However, the same cannot be said for the rear piece of the propshaft on vehicles with solid beam drive axles. Relative to the vehicle, the position of the rear joint moves vertically during operation of the vehicle. For example, when a vehicle's payload is increased or decreased, the rear joint moves vertically as the vehicle body moves toward or away from the axle. This movement alters the joint angles on the rear propshaft piece.

In addition, the orientation of the drive axle pinon shaft can change when drive torque is applied. This movement increases the joint angles. The applied torque combined with increased joint angles can cause launch shudder vibration. Launch shudder severity typically increases with higher payload, heavier throttle application, trailer towing and operating the vehicle up a grade.

Launch shudder is much less likely to occur in single piece propshafts because the joint angles are smaller, the distance between the joints is greater and the distance between the propshaft supports is greater.

In addition to the above noted distinctions between single and multi-piece propshafts, other factors also influence the selection of a propshaft. Single piece propshafts are simpler to engineer, and thus are less expensive to manufacture compared to multi-piece propshafts. In addition, multi-piece propshafts typically are more than double the weight of comparable length single piece propshafts.

The inventor has recognized a solution to one or more of the above stated problems and achieved an inexpensive and easy way to engineer a propshaft capable of operating at current vehicle operating speeds while eliminating launch shudder.

SUMMARY OF THE INVENTION

The present invention includes a propshaft assembly that has a propshaft connected to a transmission and an axle and a floating center support that attaches the propshaft to a vehicle. The floating center support permits the propshaft to move vertically during operation of the vehicle. The present invention also includes a method for damping the natural bending resonance with a center support. The floating center support may be adapted to permit the propshaft to move vertically in response to vertical movement of an axle attached to the propshaft. Alternately, the floating center support may be adapted to selectively fix the vertical position of the propshaft when the propshaft is operating near its natural bending resonance.

DETAILED DESCRIPTION

Figure 1:
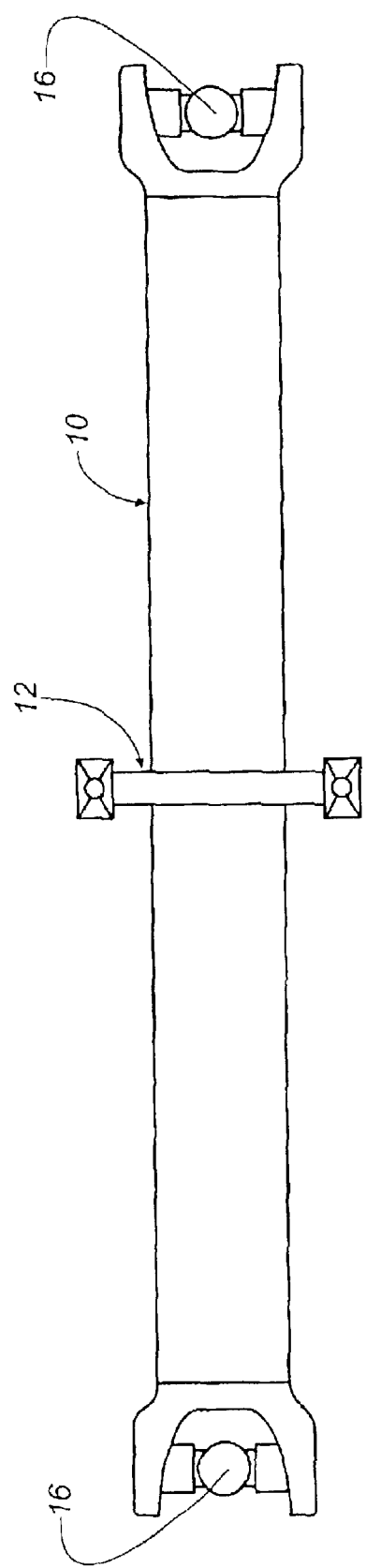
FIG. 1 shows a top view of a single piece propshaft with a center support according to the present invention.

As seen in FIG. 1, the present invention is a propshaft assembly for a vehicle that includes a floating center support 12 mounted on the propshaft tube 10. The propshaft may have articulating joints 16 at each end. The floating center support 12 is dynamic in that it allows the propshaft to move or float vertically, i.e., normal to the ground, during operation of the vehicle and also provides dampening to the propshaft. Damping includes the absorption of vibration from the propshaft, no matter the origin of the vibration. One important source of vibration is the propshaft itself; as it approaches its natural bending resonance. Other sources include vibration resulting from operation of the vehicle engine and the road conditions.

In a first aspect, the center support damps vibrations by acting as a radial force constraint, while also allowing the propshaft to move vertically. The contrasting goals of radial force constraint and movement of the propshaft can be accomplished by fixing the position of the propshaft with the center support and selectively permitting vertical movement in those situations that require vertical movement. By constraining the propshaft, the propshaft will bend less, thereby damping the natural bending resonance of the propshaft and the maximum propshaft operating speed will be increased. Furthermore, less expensive, lighter weight propshafts can be utilized.

The propshaft can also move when driving conditions demand vertical movement. For example, vertical movement of the propshaft is required when the position and orientation of the axle changes, e.g., during high powertrain torque events. This freedom of movement may be termed allowing selective movement of the propshaft.

In a second aspect, the center support damps vibrations by fixing the vertical position of the propshaft as the propshaft approaches its natural bending resonance. In this aspect, the propshaft is free to move or float vertically following the rear axle motion, but is not allowed to move due to the forces generated at or near the propshaft natural bending resonance. By fixing the position of the propshaft only when the propshaft is near its critical speed, the bending resonance response of the propshaft is temporarily muted through the damping effect of fixing the propshaft position. Once the propshaft speed moves away from the critical speed, the need for damping has lessened because the propshaft will vibrate less when it is no longer near its natural bending resonance. This aspect permits free vertical movement of the propshaft at speeds other than the critical speed. This aspect may be termed selective fixing of the propshaft.

The use of a single piece propshaft eliminates launch shudder, while the use of the floating center support increases the effective critical speed of the propshaft.

Several specific embodiments of the present invention are presented for illustration purposes only. Those skilled in the art will recognize that the combination of advantages described above can be achieve in a number of ways, all of which are incorporated into the scope of the presently claimed subject matter.

Figure 2:
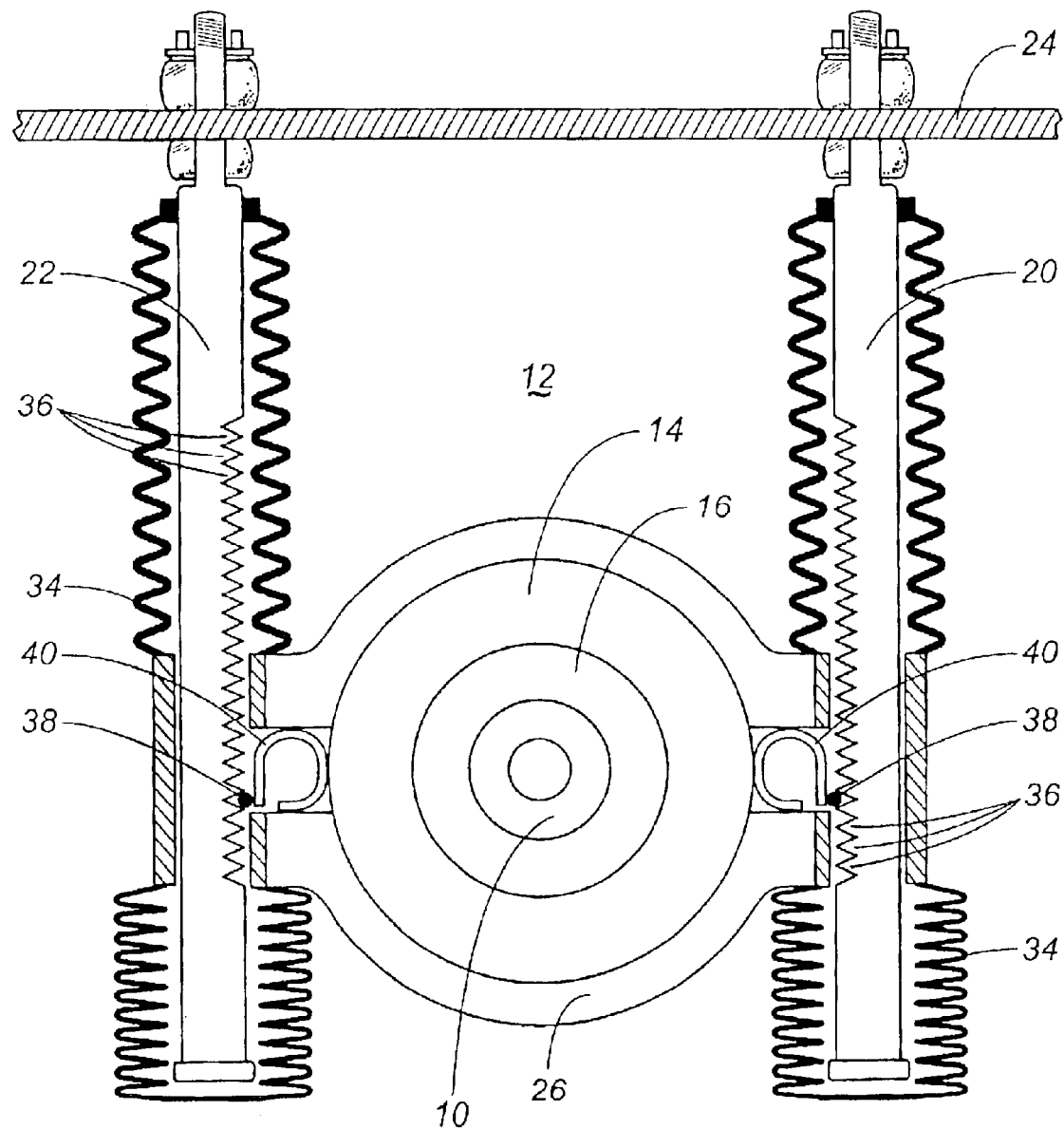
FIG. 2 shows a cross-sectional view of a center support according to the present invention.

In one embodiment illustrating the first aspect of the invention, as seen in FIG. 2, the floating center support 12 includes a pair of rails 20, 22 that attach to the vehicle underbody 24 to act as a guide path for the bearing carrier 26. The bearing carrier 26 supports an isolator 14, which in turn supports a bearing 16. In this way, the bearing carrier 26, the rails 20, 22 and the isolator 14 do not rotate in conjunction with the propshaft 10. The rails 20, 22 may be covered with a boot 34 to help prevent deterioration due to interaction with road contaminants. A lipped scraper type seal may be used in place of boot 34.

The pair of rails 20, 22 each includes a plurality of the detents 36. Notches or circumferential grooves may be used in place of detents. The bearing carrier 26 includes a roller 38 and a spring 40, where the spring 40 forces the roller 38 against the rails 20, 22. Due to the detents 36 in the rails 20, 22, the spring 40 will lodge the roller 38 in a particular detent. The force of the spring 40 on the roller 38 and the rails 20, 22, by extension, will fix the propshaft 10 in a particular vertical position. With sufficient vertical force on the propshaft 10, the spring 40 will allow the roller 38 to move to an adjacent detent 36, thus moving the propshaft vertically. Force on the propshaft is provided by a change in the position of the axle. Any forces generated by the propshaft rotation are not sufficient to move the propshaft across detents.

The strength of the spring combined with the size of the roller relative to the detent will determine the precise amount of force on the propshaft that is needed to vertically move the propshaft. In this way, the spring, roller and detent combination provide constrain for the propshaft, limiting the bending of the propshaft and damping its natural bending resonance. In addition, this combination allows vertical movement of the propshaft under appropriate conditions, thus allowing the axle to change position.

In addition, the bearing carrier and rail combination will prevent radial movement of the propshaft beyond any radial movement allowed by the isolator 14. Together, these components contribute to damp the propshaft natural bending resonance.

Inca variation, spring 40 may directly interact with the detent without the need for a separate roller. In addition, spring 40 may be integral to the bearing carrier 26 and located inside the boot 34 to allow compact packaging of the assembly.

In a variation on the first aspect of the invention, the bearing carrier and rail combination includes a geared wheel with a spring loaded follower used in place of the roller and spring combination. The geared wheel interacts with the detents of the rails to provide constraint and movement in much the same way that the spring, roller and detent combination did.

In another variation of the first aspect, each rail includes one or more springs that are generally parallel to the rails. The springs, depending on their compression strength, have an equilibrium point where they will hold propshaft in a particular vertical position. The vertical position of the propshaft, however, can change per axle position demands. These springs may be formed within the boot or the stiffness/damping rate of the boot per se can be selected to provide the desired effect to control the vertical motion of the bearing carrier.

Although preferably shown with two rails, any number of rails may be used including only one.

Several embodiments of the present invention can be used to achieve either the first or second aspect of the invention. For example, a bearing carrier with a wheel contacting the rail may be used to either selectively fix the propshaft or selectively allow movement of the propshaft. A brake attached to or apart of the wheel may be used to control the movement of the wheel with respect to the rail. To achieve selective movement, the brake may be partially applied so that a predetermined vertical force is required to adjust the position of the wheel on the rail. Alternately, the brake may be applied generally and released in response to a signal from a sensor denoting a need for a change in the vertical position of the propshaft or axle. To achieve selective fixing, the brake may be applied in response to a predetermined vehicle speed. Conventional computerized electric, hydraulic or combination brake systems may be used to actuate the brake. The wheel utilized in this set-up may be substantially smooth or geared with the rails being substantially smooth or detented, respectively.

In place of a wheel-brake combination, a brake may be utilized directly on the rail. In this variation, a brake pad contacts the rail; either abutting the rail or surrounding the rail. Similar to the wheel-brake combination, selective movement and selective fixing may be accomplished through the use of a brake pad and rail combination. Brake pads of conventional materials, such as rubber, polymer or fiber reinforced based materials, may be used to achieve the desired relationship between the brake pad and the rail. In addition to use of conventional computerized electric, hydraulic or combination brake systems, brake pads may be forced against the rail through the use of a spring. Also, the desired relationship can be achieved by selecting a cylindrical brake pad with an inner diameter roughly the same as the outer diameter of the rail such that the brake pad grips the rail.

In yet another variation, a volume of magnetic theological (MR) fluid may be retained in a cavity within the bearing carrier where it can interact with the rails. The viscosity of a MR fluid increases when an electric current is passed through the fluid. With sufficient current passing through it, the MR fluid solidifies. The viscous or solid MR fluid may be utilized to selectively fix the propshaft or to selectively allow movement of the propshaft. A MR fluid is preferably used with a detented rail to provided increased surface area between the MR fluid and the rail. Substantially smooth rails may also be useful with an MR fluid.

In yet another variation, in place of rails, the bearing carrier may be attached to the vehicle underbody by one or more shock absorbers. The shock absorbers may utilize conventional mechanical, hydraulic or combination technologies to provide selective fixing or selective movement to the propshaft.

While the invention has primarily been described in connection with single piece propshafts, a floating center support that selectively fixes or selectively permits movement of the vertical position of a multi-piece propshaft is within the scope of this invention. Such a set up could be used to lessen or eliminate the propshaft angle in a multi-piece propshaft. In addition, this invention may be used with any variety of propshafts and components, such as slip yokes or other slip mechanisms, that allow the propshaft to telescope or change in length. Use of the floating center support with both solid and hollow propshafts is within the scope of this invention. While the invention has been specifically described in connection with certain specific embodiments thereof, it is to be understood that this is by way of illustration and not of limitation, and the scope of the appended claims should be construed as broadly as the prior art will permit.

What is claimed is:

1. A propshaft assembly, comprising:
   a propshaft; and
   a center support that permits the propshaft to move vertically,
   wherein the propshaft is attached to the center support by a bearing support that includes at least one bearing carrier and wherein the center support includes at least one rail that connects to the at least one bearing carrier,
   wherein the at least one rail includes a plurality of detents,
   wherein the bearing carrier includes a roller and spring combination, a geared wheel and spring combination, a geared wheel and brake combination, or a magnetic rheological fluid.

2. The propshaft assembly of claim 1, wherein the at least one rail is substantially smooth.

3. The propshaft assembly of claim 2, wherein the bearing carrier includes a substantially smooth wheel and brake combination, a brake, or a magnetic rheological fluid.

4. The propshaft assembly of claim 1, wherein at least one spring is located in the at least one rail and the at least one bearing carrier is connected to the at least one spring.

5. The propshaft assembly of claim 1, wherein the propshaft is attached to the center support by a being carrier and wherein the center support includes at least one shock absorber.

6. The propshaft assembly of claim 1, wherein the center support is adapted to permit selective movement of the propshaft in response to vertical movement of an axle to which the propshaft is attached.

7. The propshaft assembly of claim 1, wherein the center support is adapted to selectively fix the propshaft in a position when the propshaft approaches its natural bending resonance.

8. The propshaft assembly of claim 1, wherein the center support is adapted to dampen vibrations generated by or transmitted through the propshaft.

9. The propshaft assembly of claim 1, wherein the propshaft is a single piece propshaft.

10. The propshaft assembly of claim 9, wherein the propshaft is attached to the center support by a bearing carrier and wherein the center support includes at least one rail that accepts the at least one bearing carrier.

11. The propshaft assembly of claim 9, wherein the propshaft is attached to the center support by a bearing carrier and wherein the center support includes at least one shock absorber.

12. The propshaft assembly of claim 9, wherein the center support is adapted to permit selective movement of the propshaft in response to vertical movement of an axle to which the propshaft is attached.

13. The propshaft assembly of claim 9, wherein the center support is adapted to selectively fix the propshaft in a position when the propshaft approaches its natural bending resonance.

14. The propshaft assembly of claim 9, wherein the propshaft is a single piece propshaft.

15. A propshaft assembly, comprising:
    a propshaft; and
    a center support that permits the propshaft to move vertically,
    wherein the propshaft is attached to the center support by a bearing support that includes at least one bearing carrier and wherein the center support includes at least one rail that connects to the at least one bearing carrier,
    wherein the at least one rail is substantially smooth,
    wherein the bearing carrier includes one of a substantially smooth wheel and brake combination, a brake and a magnetic rheological fluid.

16. A propshaft assembly, comprising:
    a propshaft; and
    a center support that permits the propshaft to move vertically,
    wherein the propshaft is attached to the center support by a bearing support that includes at least one bearing carrier and wherein the center support includes at least one rail that connects to the at least one bearing carrier,
    wherein at least one spring is located in the at least one rail and the at least one bearing carrier is connected to the at least one spring.

* * * * *